May 18, 1948.  A. HERTZ  2,441,763
EGG SHELL PUNCH
Filed Oct. 21, 1946
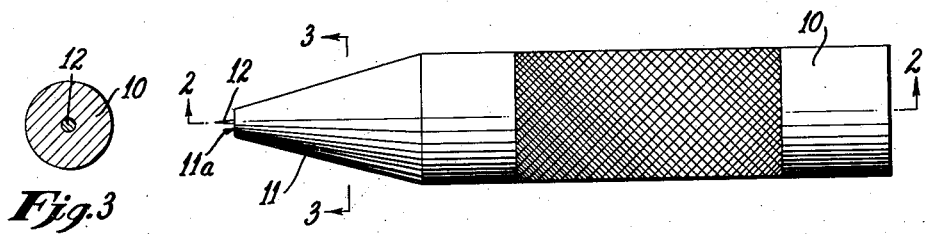
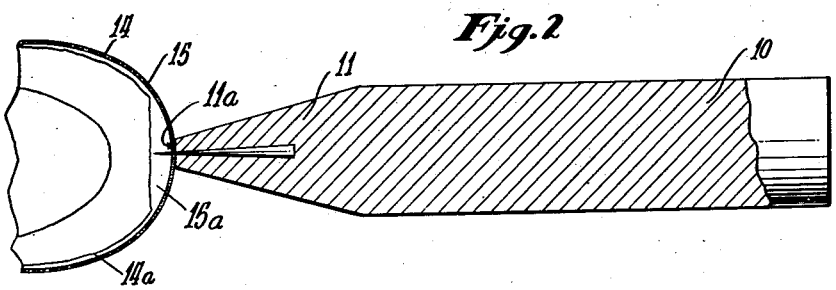
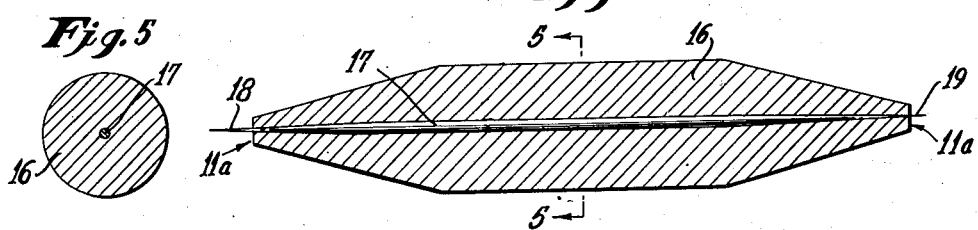
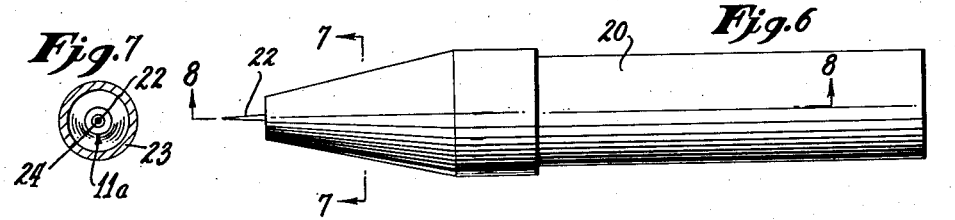
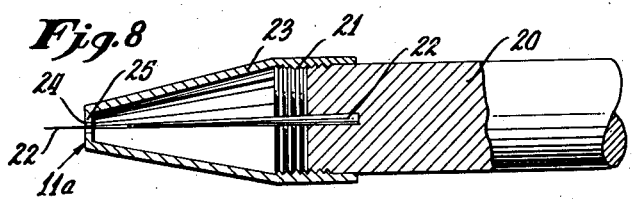
INVENTOR.
ABRAHAM HERTZ
BY J. Ledermann
ATTORNEY

Patented May 18, 1948

2,441,763

UNITED STATES PATENT OFFICE 2,441,763

EGG SHELL PUNCH

Abraham Hertz, Brooklyn, N. Y.

Application October 21, 1946, Serial No. 704,602

1 Claim. (Cl. 164—119)

This invention relates to household articles or kitchen utensils, and more particularly to the provision of means for preventing the cracking of eggs while being boiled, as frequently occurs. The cracking of eggs while being boiled is often a result of internal pressure caused by the expansion of air or other gases within the confined space of the shell, particularly in a pocket at one end of the shell, as the temperature of the egg is raised by boiling.

One object of this invention is the provision of means for puncturing the shell of an egg and the membrane adjacent the shell, leaving an orifice for the escape of any expanding gases, thereby preventing excess pressure from building up within the egg shell and thus preventing the shell from being cracked by such internal pressure.

Another object of the invention is the provision of a utensil or tool for the above-mentioned purpose which is simple in construction and operation and at the same time inexpensive in cost of manufacture.

The above and other additional and more detailed objects will become apparent in the following description, wherein characters of reference refer to like-numbered parts in the accompanying drawing. It is to be noted that the drawing is provided for the purpose of illustration only and that it is neither desired nor intended to limit the invention to any or all of the specific details of construction shown, excepting insofar as they may be deemed essential to the invention.

Referring briefly to the drawing,

Fig. 1 is a side view of one form of the tool.

Fig. 2 is a sectional view taken on the line 2—2 of Fig. 1, and in addition shows part of an egg in cross-section.

Fig. 3 is a sectional view taken on the line 3—3 of Fig. 1.

Fig. 4 is a longitudinal sectional view of a modified form of the device.

Fig. 5 is a sectional view taken on the line 5—5 of Fig. 4.

Fig. 6 is a side view of another modified form of the device.

Fig. 7 is a sectional view taken on the line 7—7 of Fig. 6.

Fig. 8 is a fragmentary sectional view taken on the line 8—8 of Fig. 6.

Referring in detail to the drawing, the numeral 10 indicates a cylindrical handle of any suitable material, tapered at one end as shown at 11, and having a pointed steel pin 12 imbedded therein, substantially aligned with the axis of the handle 10. The handle 10 may be knurled or provided with any desired type of grip, or may be left smooth, as desired.

In using the tool, the user selects the large and rounder end of the egg to be punctured, aligns the point 12 of the device substantially in the center thereof, and presses the point against the shell 14, thereby puncturing the same and also puncturing the membrane 15 of the egg and giving access to the air pocket 15a. The small orifice punctured in the shell allows the escape of expanding air or gases from within the shell as the egg is heated, but is small enough so that the albumin or white of the egg will not escape. The shoulder 11a at the base of the pin 12 serves as a limit stop to the pin so that the latter cannot pierce the inner membrane 14a.

Fig. 4 illustrates a substantially similar form of the device with the following exceptions: The handle 16 is tapered at both ends and the steel rod extends axially throughout the entire length thereof and terminates in a point at each end, shown at 18 and 19, one point being longer and hence of greater diameter than the other, to increase the utility of the device in the case of various sized eggs. Instead of the single rod 17, however, only the two pointed extremities might be used as pins.

A third modification shown in Fig. 6 comprises a cylindrical handle 20, threaded at one end as shown at 21 and having a relatively long steel pin embedded therein as previously described. A hollow conical shell 23 is threaded complementarily to the threads 21 of the handle 20 within its larger end and has a hole 24 substantially in the center of the closure 25 of its smaller end. The pin 22 passes freely through the hole 24. Obviously, turning the shell 23 with relation to the handle 20 will expose a greater or smaller length of the pin 22 and so effect a larger diameter of acting punch through the hole 24, thus providing an adjustment for the device when used on varying sizes of eggs. In each of the two modified forms of the device, the shoulder 11a serves as a limit stop in the manner described above.

Obviously, modifications in form and structure may be made without departing from the spirit and scope of the invention.

I claim:

A tool of the class and for substantially the purpose described, comprising a handle, said handle being tapered to a shoulder at each end, a rod extending axially throughout the length of said handle and terminating in a pointed pin outside each of said shoulders, one of said pins being longer than the other of said pins.

ABRAHAM HERTZ.

REFERENCES CITED

The following references are of record in the file of this patent:

UNITED STATES PATENTS

| Number | Name | Date |
|---|---|---|
| 27,913 | Lane | Apr. 17, 1860 |
| 194,347 | Grafelmann | Aug. 21, 1877 |
| 289,738 | Wiedersheim | Dec. 4, 1883 |
| 768,126 | Huber | Aug. 23, 1904 |
| 957,154 | | |
| 1,489,813 | | |
| 1,491,908 | | |
| 1,631,175 | | |
| 1,688,258 | | |
| 2,390,309 | | |

| Number | Name | Date |
|---|---|---|
| 68,039 | Gallinek | May 3, 1910 |
| 96,466 | Bewsick | Apr. 8, 1924 |
| 318,689 | Greig | Apr. 29, 1924 |
| 593,806 | Winkler | June 7, 1927 |
| | Young | Oct. 16, 1928 |
| | Keys | Dec. 4, 1945 |

FOREIGN PATENTS

| Number | Country | Date |
|---|---|---|
| 68,039 | Switzerland | Feb. 1, 1915 |
| 96,466 | Switzerland | Oct. 16, 1922 |
| 318,689 | Germany | Feb. 7, 1920 |
| 593,806 | Germany | May 5, 1934 |